United States Patent [19]

Cziptschirsch

[11] 4,178,035

[45] Dec. 11, 1979

[54] SUN VISOR FOR MOTOR VEHICLES

[75] Inventor: Kurt Cziptschirsch, Wuppertal, Fed. Rep. of Germany

[73] Assignee: Gebr. Happich GmbH, Fed. Rep. of Germany

[21] Appl. No.: 842,317

[22] Filed: Oct. 14, 1977

[30] Foreign Application Priority Data

Nov. 27, 1976 [DE] Fed. Rep. of Germany ....... 2653988

[51] Int. Cl.² ................................................. B60J 3/00
[52] U.S. Cl. .............................. 296/97 K; 296/97 R
[58] Field of Search .................. 296/97 R, 97 E, 97 H, 296/97 K

[56] References Cited

U.S. PATENT DOCUMENTS

| | | | |
|---|---|---|---|
| 2,458,707 | 1/1949 | Jacobs | 296/97 K |
| 3,150,896 | 9/1964 | Plattner | 296/97 K |
| 3,910,627 | 10/1975 | Meyer | 296/97 X |

*Primary Examiner*—Richard A. Bertsch
*Attorney, Agent, or Firm*—Ostrolenk, Faber, Gerb & Soffen

[57] ABSTRACT

A sun visor for a motor vehicle including a visor body, a bearing axle which is u-shaped in cross-section so that its arms exert a radial, twist resisting force and a bearing housing into which the axle is fitted and which, in turn, snap attaches to a receiving opening for it in the vehicle.

18 Claims, 3 Drawing Figures

U.S. Patent
Dec. 11, 1979
4,178,035
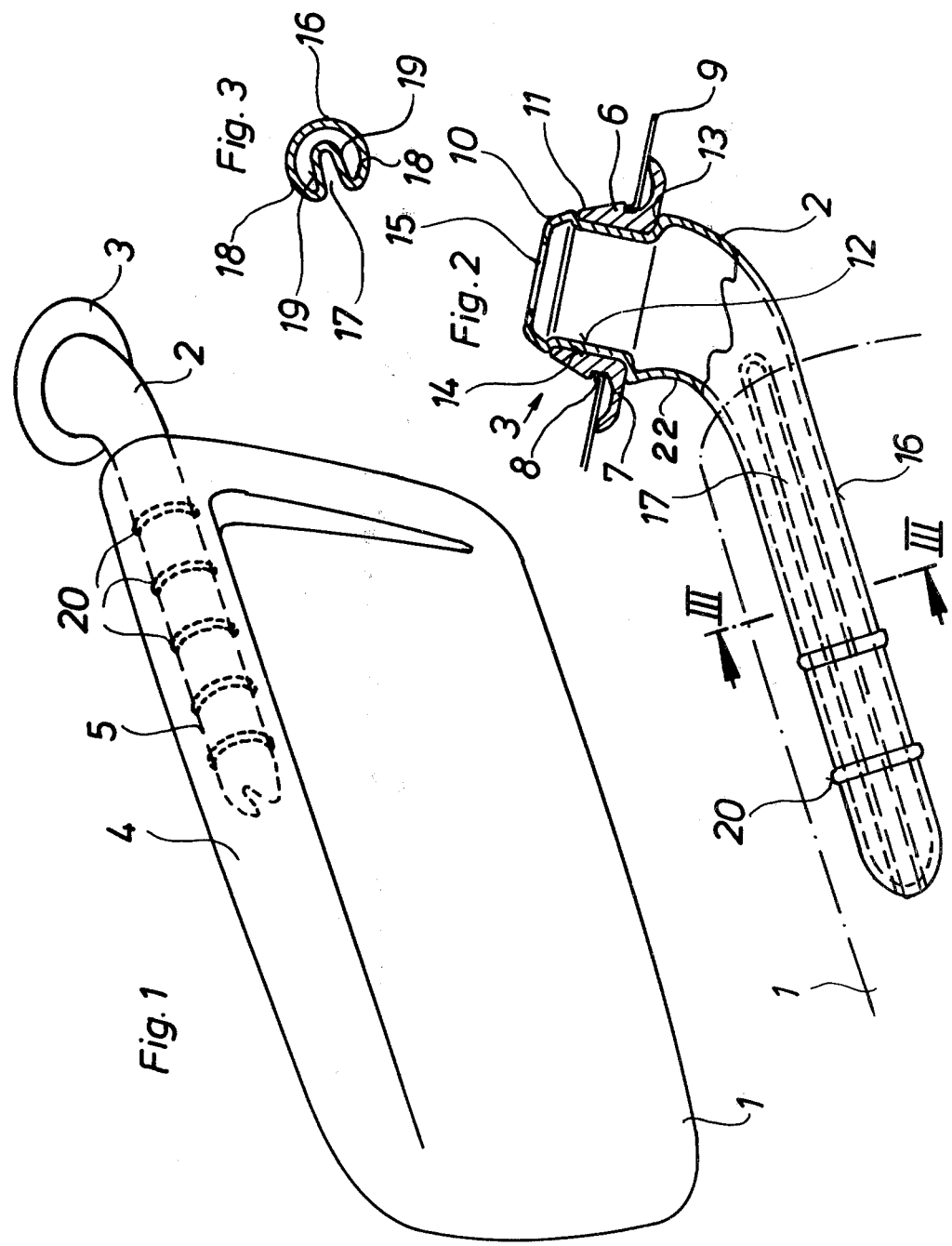

SUN VISOR FOR MOTOR VEHICLES

The invention relates to a sun visor for a motor vehicle. The visor includes a visor body, a bearing axle and a bearing housing.

BACKGROUND OF THE INVENTION

There are many different sun visors. They are generally formed of many separate parts, making them relatively expensive to construct and tedious to install. Most known visors are installed by being screwed into place. For example, the bearing housings are generally screwed to the roof frame of the vehicle. Also, known sun visors often are not safe, as some of their parts are made of metal. This is true of the bearing axles and generally also of the bearing housings.

SUMMARY OF THE INVENTION

The object of the invention is to provide an improved, sun visor, which is easier to manufacture and install and which provides better protection against accident injuries.

Another object of the invention is to minimize the number of separate parts of which a sun visor is comprised.

According to the invention, the bearing axle of the sun visor is a blown hollow body of plastic material. It comprises bearing means for connecting it to the visor body and to the bearing housing. A bearing axle made by a blowing process is simple and inexpensive to manufacture. Furthermore, upon impact, the blown, hollow bearing axle is resiliently deformable and thus acts as an elastic buffer, particularly in case of an accident. It may be helpful if the hollow bearing axle is filled with a plastic foam.

The bearing axle is approximately L-shaped. Its short leg is provided with detents and it can be inserted into a plug opening in the bearing housing. The visor body has a plug-in opening for receiving the long leg of the L-shaped bearing axle.

The bearing housing is attached at one end of the bearing axle. The bearing housing is a rotationally symmetrical plug-in body, including a plug opening. The rotation-symmetrical plug-in body of the bearing housing preferably is in the form of a rosette including a projecting plug-in pin at the free front end and a flange formed at the rear end. The plug-in pin tapers conically toward the free end. The body of the housing has an annular, groove type undercut in its transition between the plug-in pin and the rearward flange. The foregoing design gives the plug-in body and the bearing housing an aesthetically pleasing form and a shape that supports the plugging in. The bearing housing is mountable to the motor vehicle body. The roof frame of the vehicle has a hole of a size such that the annular, groove type undercut on the bearing housing can snap into the hole. This securely holds the plug body to the roof.

It is beneficial when the side of the flange that faces toward the plug pin has a hollowed out, rounded form as it is resiliently self biased against the part of the vehicle roof around the bearing housing receiving hole, thereby providing a spring support of the plug-in body on the vehicle roof frame.

The plug-in body may be an injection-molded part of an elastic plastic material, which is easy and inexpensive to manufacture.

Simple plugging in and reliable retention of the bearing axle in the bearing housing can be achieved as the short leg of the axle is designed at its free end region in a mushroom head shape. A cylindrical shank is located beneath the free, mushroom head, end region of the bearing axle. The shank has the length of the plug opening of the plug body. The shank of the axle terminates at its lower end in a radially outwardly directed encircling shoulder. The outside diameter of the shank of the axle is approximately the diameter of the plug opening for securely holding the bearing axle in the bearing housing. The short leg of the bearing axle is pivotably mounted in the plug opening of the bearing housing, so that the visor body can be selectively pivoted over the windshield or toward a side window. Retention of the visor body in any pivoted position is by friction.

To enable the visor body to retain any pivoted position, the long leg of the bearing axle may have a seam extending in a longitudinal direction along the long leg and projecting radially inwardly giving the long leg a U-shaped cross-section. The depth of the U-shaped depression into the bearing axle is preferably greater than the radius of the bearing axle long leg. This design imparts to the two arms of the U-shaped longer axle leg a high spring force which is directed radially outwardly. This radial force is operative when the axle leg is plugged into the receiving opening therefor in the visor body, as this opening in the visor body is narrower than the outside diameter of the longer axle leg. The visor body is pivotable about the long leg of the bearing axle by about 180°. The spring force of the longer axle leg suffices to retain the visor body in every pivoted position.

The friction surface between the axle and the visor body can be increased by distributing over the long leg of the bearing axle several outwardly protruding annual ribs, which are aligned normal to the longitudinal axis of the long leg. The ribs dig themselves into the visor body material and also prevent unintended separation of the visor body from the bearing axle.

The visor body is of known design. It is a foam body, which has a thickened upper marginal region in which the reception opening for the bearing axle is arranged. The outer surfaces of the foam body may be compacted and/or they may be backed with a foil layer.

A sun visor formed according to the invention need be comprised of merely three parts, which are easy and inexpensive to manufacture, especially when these parts are made of plastic. The sun visor of the invention is simply installed, as its individual parts are plugged together. To attach the sun visor into a motor vehicle, its bearing housing is simply plugged into a prepared hole in the roof frame.

Other objects and features of the invention will be explained below with reference to an embodiment of the invention illustrated in the drawings.

BRIEF DESCRIPTION OF THE DRAWINGS

FIG. 1 is a perspective view of a complete sun visor incorporating the invention;

FIG. 2 is a fragmentary view of the sun visor of FIG. 1, partly in cross-section; and FIG. 3 is a cross-sectional view along line III—III in FIG. 2.

DESCRIPTION OF A PREFERRED EMBODIMENT

The sun visor of FIG. 1 is comprised of three parts, namely the visor body 1, the bearing axle 2 and the bearing housing 3.

The visor body 1 is of conventional construction and has a rectangular, oblong shape with rounded corners. The upper marginal region of the body has a thickened region 4 with a receiving or plug opening 5 for the bearing axle 2.

The bearing housing 3 is a rotation symmetrical plug body having the general appearance of a rosette. The housing 3 has a hollow plug pin 6 with a flange 7 formed at its rear end. The plug pin 6 tapers conically narrower toward its free end away from visor body 1. At the transition from the plug pin 6 to the flange 7 at the rear end, an encircling, groove type undercut 8 is defined. The annular internal edge of a plug hole in the roof frame 9 of a motor vehicle is sized to snap past the taper of pin 6 and into the undercut 8. Attachment of the rosette like pin 6 to the vehicle body can thus occur in a simple snap-in manner. The plug pin 6 is tightly spring supported in place in that the flange 7 is resilient and is curved toward the plug pin 6 to define the rounded hollow space inside curved flange 7 and beneath the section of the vehicle frame which flange 7 engages. Emplacement of the plug pin tensions the flange 7 and this, in turn, holds the plug pin 6 in place.

The bearing axle 2 is approximately L-shaped. The short leg 22 ends in the generally mushroom shaped head 10. Beneath the head 10 is the contiguous undercut shoulder 11 and beneath this, there is a cylindrical shank 12 whose length is defined by the radially outwardly directed shoulder 13 which is spaced from shoulder 11. The diameter and length of shank 12 correspond to the diameter and length of the plug-in opening 14 of the bearing housing 3.

The bearing axle 2 is formed by a hollow blowing process. It has an opening 15, through which a foam filling can be introduced into the bearing axle cavity.

The longer leg 16 of the bearing axle 2 is designed to exert a radial spring force. The leg 16 has a seam or depression 17 extending longitudinally along the leg. Seam 17 gives leg 16 a U-shaped cross-section and defines elongated spring arms 18, 19 which exert a radially outward force when these legs are squeezed together. The receiving opening 5 of the visor body is narrower than the outwardly sprung long leg 16. Plugging of the long leg 16 into the opening 5 squeezes the seam 17 closed, counter to the outward force of the spring arms 18, 19. The outer wall of the longer axle leg 16 presses against the interior wall of the receiving opening 5 with relatively great, fatigueless spring force.

Pulling off the visor body 1 from the bearing axle 2 is counteracted by the spring force of leg 16 and also by the annular ridges 20, which are distributed over the surface of the longer leg 16 of the bearing axle 2.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A sun visor for use in a motor vehicle, or the like, comprising:
   a visor body shaped to serve as a visor;
   a bearing housing adapted for mounting to the body of the vehicle, or the like; said bearing housing comprising a rotationally symmetric plug body having a plug opening extending into it; and
   a bearing axle comprising: a first leg having bearing means thereon for enabling connection of said axle with said visor body and for enabling pivoting of said visor body around said axle first leg; said bearing axle also being pluggable into said bearing housing plug opening;
   said plug body being generally in the form of a rosette including a forwardly extending plug pin and a flange at the rear of said plug pin; said plug pin tapering conically narrower to the end thereof away from said flange;
   a transition between said plug pin and said flange, said transition being annular and narrowed in diameter as compared with said plug pin at said transition, thereby to define a groove type undercut at said transition,
   said plug body plug opening extending through said flange and said transition into said plug pin.

2. The sun visor of claim 1, wherein said flange is annular and is also curved upwardly toward said plug pin to define an annular hollow space within said flange.

3. The sun visor of claim 2, wherein said plug body is comprised of injection molded plastics material.

4. A sun visor for use in a motor vehicle, or the like, comprising:
   a visor body shaped to serve as a visor;
   a bearing housing adapted for mounting to the body of the vehicle, or the like; said bearing housing comprising a rotationally symmetric plug body having a plug opening extending into it; and
   a bearing axle comprising: a first leg having bearing means thereon for enabling connection of said axle with said visor body and for enabling pivoting of said visor body around said axle first leg; said bearing axle also being pluggable into said bearing housing plug opening;
   said visor includes a second plug opening; said bearing axle being approximately L-shaped, and having its said first leg bearing means pluggable into said visor body second plug opening;
   said bearing axle having a second leg that is pluggable into said bearing housing plug opening.

5. The sun visor of claim 4, wherein said bearing axle second leg includes holding means for holding said axle plugged into said bearing housing plug opening.

6. The sun visor of claim 5, wherein said holding means comprises said axle second leg having a free end that is generally in the shape of a mushroom head, and beneath said free end thereof, said axle second leg having a shank with an axial length that corresponds to the axial length of said plug body plug opening; a shoulder beneath said shank on said axle second leg, said shoulder having a width so as to prevent entrance of said shoulder into said plug body plug opening, whereby said free end and said shank of said second axle leg are snap detent fitted into said plug body plug opening and are held there by said free end and said shoulder of said second leg.

7. The sun visor of claim 6, wherein said axle first leg has a seam running along its length and being directed radially inwardly of said first leg, such that said first leg is U-shaped in cross-section; said U-shaped axle first leg having arms adapted to exert a radially outward force upon being compressed together.

8. The sun visor of claim 7, wherein said visor body includes a marginal region which is thickened and in which said second plug opening is formed; said second plug opening having a smaller diameter than the outside diameter of said bearing axle first leg, thereby to afford a friction connection between said bearing axle first leg and said second plug opening.

9. The sun visor of claim 7, wherein said first leg has several annular ridges thereon distributed along its length and said ridges being aligned normal to the longitudinal axis of said first leg.

10. The sun visor of claim 9, wherein said bearing axle comprises a blown hollow body of plastics material.

11. The sun visor of claim 4, wherein said axle first leg has a seam running along its length and being directed radially inwardly of said first leg, such that said first leg is U-shaped in cross-section; said U-shaped axle first leg having arms adapted to exert a radially outward force upon being compressed together.

12. The sun visor of claim 11, wherein said seam has a depth into said first leg that is greater than the radius of said first leg.

13. The sun visor of claim 12, wherein said first leg has several annular ridges thereon distributed along its length and said ridges being aligned normal to the longitudinal axis of said first leg.

14. The sun visor of claim 4, wherein said first leg has several annular ridges thereon distributed along its length and said ridges being aligned normal to the longitudinal axis of said first leg.

15. The sun visor of claim 4, wherein said visor body includes a marginal region which is thickened and in which said second plug opening is formed; said second plug opening having a smaller diameter than the outside diameter of said bearing axle first leg, thereby to afford a friction connection between said bearing axle first leg and said second plug opening.

16. The sun visor of claim 15, wherein said axle first leg has a seam running along its length and being directed radially inwardly of said first leg, such that said first leg is U-shaped in cross-section, and the arms of said U-shaped axle first leg being adapted to exert a radially outward force upon being compressed together.

17. The sun visor of claim 4, wherein said bearing axle comprises a blown hollow body of plastics material.

18. The sun visor of claim 17, wherein said bearing axle has a hollow cavity therein which is filled with a plastics foam.

* * * * *